Patented Mar. 18, 1941

2,235,145

UNITED STATES PATENT OFFICE 2,235,145

ALKYLIDENE DI-SULPHANILAMIDES AND PROCESS FOR MAKING THEM

Joseph Ebert, Westmont, N. J., assignor to The Farastan Company, Philadelphia, Pa., a corporation of Pennsylvania No Drawing. Application December 27, 1939, Serial No. 311,129

6 Claims. (Cl. 260—556)

This invention relates to new derivatives of p-aminobenzenesulphonamide. It relates more particularly to new derivatives obtained by reacting p-aminobenzenesulphonamide with certain aliphatic aldehydes, with the production of alkylidene derivatives which have important advantages for use in the treatment of streptococcus, pneumococcus and staphylococcus infections.

p-Aminobenzenesulphonamide and certain other amides have been recognized as having great value for the treatment of coccus infections. p-Aminobenzenesulphonamide has been shown to have particular value in the treatment of streptococcus infections, while the more or less related compound known as sulphapyridine has been shown to be valuable for the treatment of pneumococcus infections. These materials have, however, been subject to certain disadvantages, particularly the disadvantage of not giving consistently good results and of having a relatively high ratio of effective dose to toxic dose. The new compounds of the present invention have important advantages over the previously known compounds such as p-aminobenzenesulphonamide and sulphapyridine in having greater effectiveness for the treatment of streptococcus, staphylococcus, gonococcus and pneumococcus infections, particularly pneumococcus infections, while at the same time having a low toxicity, as compared, for example, with p-aminobenzenesulphonamide. The new compounds of the invention are prepared by reacting an aliphatic aldehyde, particularly a fatty aldehyde, having from 8 to 18 carbon atoms, with p-aminobenzenesulphonamide, with the production of the corresponding alkylidene compound, in accordance with the equation:

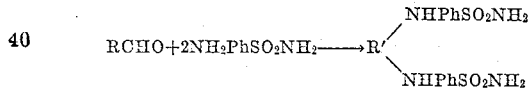

in which R' is an alkylidene group having from eight to eighteen carbon atoms.

The yield in this reaction is close to theoretical. It may be carried out with or without the use of a solvent, although the use of a solvent gives somewhat better results. It may be carried out by leaving the reaction mixture stand for some time at room temperature, or, somewhat more rapidly, by heating the reaction mixture for several hours on the water bath with refluxing.

The invention will be illustrated by the following specific examples, but it is not limited thereto.

*Example 1.*—6.4 parts of capryl aldehyde and 17.2 parts of p-aminobenzenesulphonamide (molar ratio of 1 to 2) are mixed in an open container. Some evolution of heat takes place. The reaction mixture is dissolved in 50 parts of methyl alcohol and is allowed to stand for about 24 hours. The solvent is then removed by evaporation or distillation, with the production of caprylidene di-p-aminobenzenesulphonamide. The product as produced is practically 100% pure. It is obtained in a yield of 96 to 99% theory. It is a crystalline compound. The crystals are of a somewhat waxy character and melt at 140–142° C. (uncorrected) with decomposition.

*Example 2.*—After the reaction mixture of the preceding example is dissolved in the methyl alcohol, the resulting solution is heated in a vessel equipped with a reflux condenser for six to seven hours on the water bath, after which the solvent is removed by distillation. The product is the same as that of Example 1.

*Example 3.*—7.1 parts of nonyl aldehyde and 17.2 parts of p-aminobenzenesulphonamide and 50 parts of methyl alcohol are treated as in Example 1. The product is worked up in the same way. The nonylidene di-p-aminobenzenesulphonamide produced melts at 138–140° C. (uncorrected) with decomposition. It is insoluble in water and soluble in alcohol and other organic solvents.

*Example 4.*—8.5 parts of undecyl aldehyde and 17.2 parts of p-aminobenzenesulphonamide are reacted as in Example 1 or 2. The resulting undecylidene di-p-aminobenzenesulphonamide forms white, somewhat waxy crystals having a melting point of 133–136° C. (uncorrected) with decomposition, is insoluble in water and is soluble in alcohol or other organic solvents.

*Example 5.*—9.2 parts by weight of dodecyl aldehyde and 17.2 parts of p-aminobenzenesulphonamide are reacted as in Example 1 or 2. The resulting dodecylidene di-p-aminobenzenesulphonamide forms white or yellowish-white waxy crystals, melting at 140–144° C. (uncorrected) with decomposition. It is insoluble in water and is soluble in alcohol and other organic solvents.

Similar products are obtained from other aliphatic aldehydes having from 8 to 18 carbon atoms by the same general procedure, involving reaction of one mole of the aldehyde with two moles of the p-aminobenzenesulphonamide, with the production of the corresponding alkylidene di-p-aminobenzenesulphonamide.

These compounds, as pointed out above, have great value for the treatment of various coccus infections, particularly pneumococcus infections.

I claim:

1. An alkylidene di-p-aminobenzenesulphonamide, in which the alkylidene group has from 8 to 18 carbon atoms.

2. Compounds of the formula

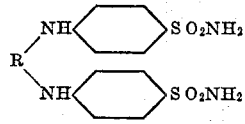

in which R represents an alkylidene group having from 8 to 18 carbon atoms.

3. Caprylidene di-p-aminobenzenesulphonamide.

4. Nonylidene di-p-aminobenzenesulphonamide.

5. Undecylidene di-p-aminobenzenesulphonamide.

6. The method of preparing alkylidene di-p-aminobenzenesulphonamides which comprises reacting an alkyl aldehyde having from 8 to 18 carbon atoms in the alkyl radical with p-aminobenzenesulphonamide in the molar proportions of one to two.

JOSEPH EBERT.